United States Patent
Thomson et al.

(10) Patent No.: US 9,106,348 B2
(45) Date of Patent: Aug. 11, 2015

(54) USING UNSCHEDULED AUTOMATIC POWER SAVE DELIVERY TO ACHIEVE COEXISTENCE WITH INTERFERING SOURCES

(75) Inventors: Allan Thomson, Pleasanton, CA (US); David Stephenson, San Jose, CA (US); Brian Hart, Sunnyvale, CA (US); Kasi Nalamalapu, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 956 days.

(21) Appl. No.: 12/909,307

(22) Filed: Oct. 21, 2010

(65) Prior Publication Data

US 2011/0222524 A1 Sep. 15, 2011

Related U.S. Application Data

(60) Provisional application No. 61/313,881, filed on Mar. 15, 2010.

(51) Int. Cl.
*H04W 74/08* (2009.01)
*H04H 40/18* (2008.01)

(52) U.S. Cl.
CPC .......... *H04H 40/18* (2013.01); *H04W 74/0816* (2013.01); *H04H 2201/60* (2013.01)

(58) Field of Classification Search
USPC ............. 370/310.2, 324, 328–339, 349, 350, 370/503, 507–514; 455/422.1
See application file for complete search history.

(56) References Cited

U.S. PATENT DOCUMENTS

| | | | | |
|---|---|---|---|---|
| 8,134,992 | B1* | 3/2012 | Nam et al. ..................... | 370/345 |
| 2006/0221926 | A1* | 10/2006 | Maekawa et al. ............. | 370/345 |
| 2007/0066222 | A1* | 3/2007 | Tao et al. ...................... | 455/41.2 |
| 2007/0275746 | A1* | 11/2007 | Bitran ........................... | 455/509 |
| 2007/0281617 | A1* | 12/2007 | Meylan et al. ................ | 455/41.2 |
| 2008/0101320 | A1* | 5/2008 | Krahn et al. .................. | 370/342 |
| 2009/0137206 | A1* | 5/2009 | Sherman et al. ............. | 455/41.2 |
| 2009/0213773 | A1* | 8/2009 | Yoon et al. .................... | 370/311 |
| 2009/0252122 | A1* | 10/2009 | Leinonen et al. ............. | 370/332 |
| 2009/0258607 | A1* | 10/2009 | Beninghaus et al. .......... | 455/77 |
| 2010/0142500 | A1* | 6/2010 | Sudak ........................... | 370/338 |
| 2010/0273426 | A1* | 10/2010 | Walley et al. ................. | 455/63.1 |
| 2012/0020348 | A1* | 1/2012 | Haverinen et al. ............ | 370/339 |

* cited by examiner

*Primary Examiner* — Hoon J Chung
(74) *Attorney, Agent, or Firm* — Patterson & Sheridan, LLP (57) ABSTRACT

In an example embodiment, there is disclosed a technique that enables a wireless device to achieve coexistence with an interfering source. The wireless device determines when interference is present and not present during a service period and reports the duration of interference free interval. At the end of an interference period, the wireless device can send a trigger signal indicating the start of an interference free interval to request data be sent to the wireless station until the expiration of the duration of the interference free interval. In particular embodiments, the signal sent by the wireless device can include an offset, for example a timing synchronization function (TSF) value, to indicate the end of the interference-free interval, perhaps computed so as allow for some clock drift.

21 Claims, 7 Drawing Sheets

| ORDER | IE |
|---|---|
| 1 | CATEGORY |
| 2 | ACTION |
| 3 | DIALOG TOKEN |
| 4 | TSPEC |
| 5 | TCLAS |
| 6 | TCLAS PROCESSING |
| 7 | COEXISTENCE (OPTIONAL) |

Fig. 4

| ELEMENT ID | LENGTH | TSF 0 OFFSET | INTERVAL/ DURATION | OPTIONAL SUBELEMENTS |
|---|---|---|---|---|
| 1 | 1 | 8 | 4 | VARIABLE |

OCTETS:

USING UNSCHEDULED AUTOMATIC POWER SAVE DELIVERY TO ACHIEVE COEXISTENCE WITH INTERFERING SOURCES

CROSS REFERENCE TO RELATED APPLICATIONS

This application claims the benefit of U.S. Provisional Application No. 61/313,881, filed Mar. 15, 2010.

TECHNICAL FIELD

The present disclosure relates generally to the co-existence of wireless protocols such as wireless fidelity (WiFi) and Bluetooth.

BACKGROUND

Many silicon vendors are integrating their wireless fidelity (WiFi) and BLUETOOTH (BT) radios into an integrated design where an antenna is shared with both radios. This creates coexistence problems because BLUETOOTH does not employ a listen before talk (LBT) protocol. Consequently, WiFi throughput may suffer while BLUETOOTH is active and vice versa. In some devices, such as a handset, coordination between transmission of WiFi and BLUETOOTH radios is readily achievable; however, reception can be a problem. For example, where BLUETOOTH and WiFi share a common antenna, the WiFi radio can become severely desensitized and unable to receive transmissions, such as downstream transmissions from an access point (AP), while the BLUETOOTH radio is transmitting; or can be deliberately prevented from transmitting frames, including acknowledgements, to its AP in order not to interfere with active BLUETOOTH communications.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising an antenna, a first wireless transceiver coupled with the antenna, a second wireless transceiver coupled with the antenna, and control logic coupled with the first wireless transceiver and the second wireless transceiver. The control logic controls the operation of the first wireless transceiver and the second wireless transceiver. The control logic operates first wireless transceiver for a first predetermined time period during a service period. The control logic determines a second predetermined time period during the service period that does not conflict with the first time period where the second wireless transceiver can receive signals. The control logic sends a signal with data representative of the second predetermined time period via the second wireless transceiver. The control logic sends a trigger signal after the expiration of the first predetermined time period.

In accordance with an example embodiment, there is disclosed herein, a method, comprising determining during a service period, a first time period where interference is present. The method determines a duration of time during the service period where interference is not present. A first signal is sent. The first signal comprises data representative of the duration of time during the service period where interference is not present. A trigger signal is sent after the first time period has expired indicating the start of the service period where interference is not present.

In accordance with an example embodiment, there is disclosed herein an apparatus comprising a wireless transceiver and control logic coupled to the wireless transceiver that sends and receives data via the wireless transceiver. The control logic broadcasts data indicating that the control logic supports a coexistence service via the wireless transceiver. The control logic determines from a signal received from a mobile device via the wireless transceiver whether the mobile device is requesting the coexistence service and a maximum time period that the mobile device can receive frames. The control logic buffers frames for the mobile device responsive to receiving a signal from the mobile device requesting the coexistence service. The control logic sends the buffered frames to the mobile device responsive to receiving a predefined frame via the wireless transceiver. The buffered frames are sent until no more frames are buffered or the wireless transceiver or mobile device have sent a frame including End Of Service Period (EOSP) or the maximum time period expires.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment disclosed herein, there is described a technique that enables a mobile wireless device to signal an access point (AP) that the mobile wireless device is detecting interference and a time period when there is no interference. An information element (IE) is added to an Unscheduled Automatic Power Save Deliver (U-APSD) request frame (e.g., ADDTS request) indicating that the duration of the time period that the AP can send frames. The mobile wireless device sends a trigger frame after interference has stopped to signal the AP that the AP can send data until the duration has expired. The mobile wireless device chooses a duration that ensures non-overlap with an interfering source such as a BLUETOOTH (BT) transmission and/or reception to/from a wireless transceiver coupled with a common antenna.

In particular embodiments, the mobile wireless device may include an offset such as a Timing Synchronization Function (TSF) value, to indicate the end of the interference-free period optionally adjusted to provide some compensation for clock drift. This would signal the AP to send data during a specific time period starting after a predefined delay and ending after the duration period has expired.

Figure 1:
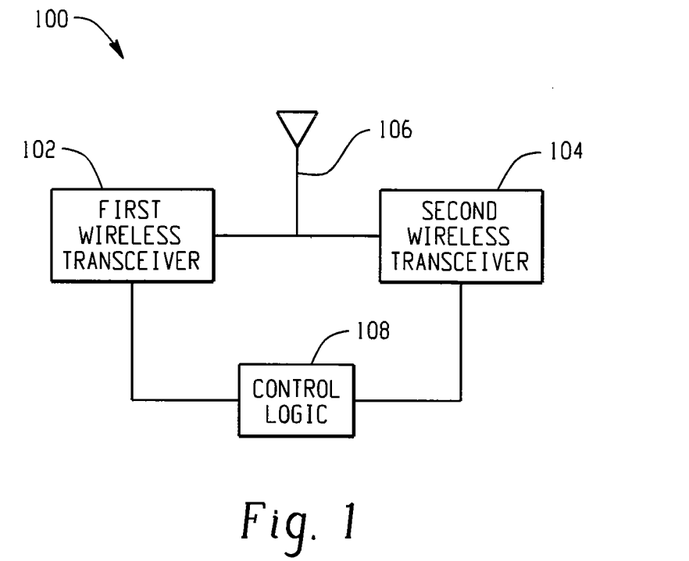
FIG. 1 is a block diagram illustrating an example of an apparatus with multiple wireless transceivers sharing an antenna.

FIG. 1 is a block diagram illustrating an example of an apparatus 100 with multiple wireless transceivers 102, 104 sharing an antenna 106. Control logic 108 is coupled with wireless transceivers 102, 104 and is operable to send and/or receive data via wireless transceivers 102, 104 and to control the operation of wireless transceivers 102, 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, first wireless transceiver 102 and second wireless transceiver 104 share antenna 106. While first wireless transceiver 102 is transmitting, second wireless transceiver 104 is unable to receive signals. Control logic 108 determines a time period when first wireless transceiver 102 is not transmitting. Control logic then signals the duration of the time period to a wireless device in communication with second wireless transceiver 104. When an interfering time period has ended, control logic 108 sends a trigger frame indicating the beginning of the time period when second wireless transceiver 104 can receive data.

Figure 2:
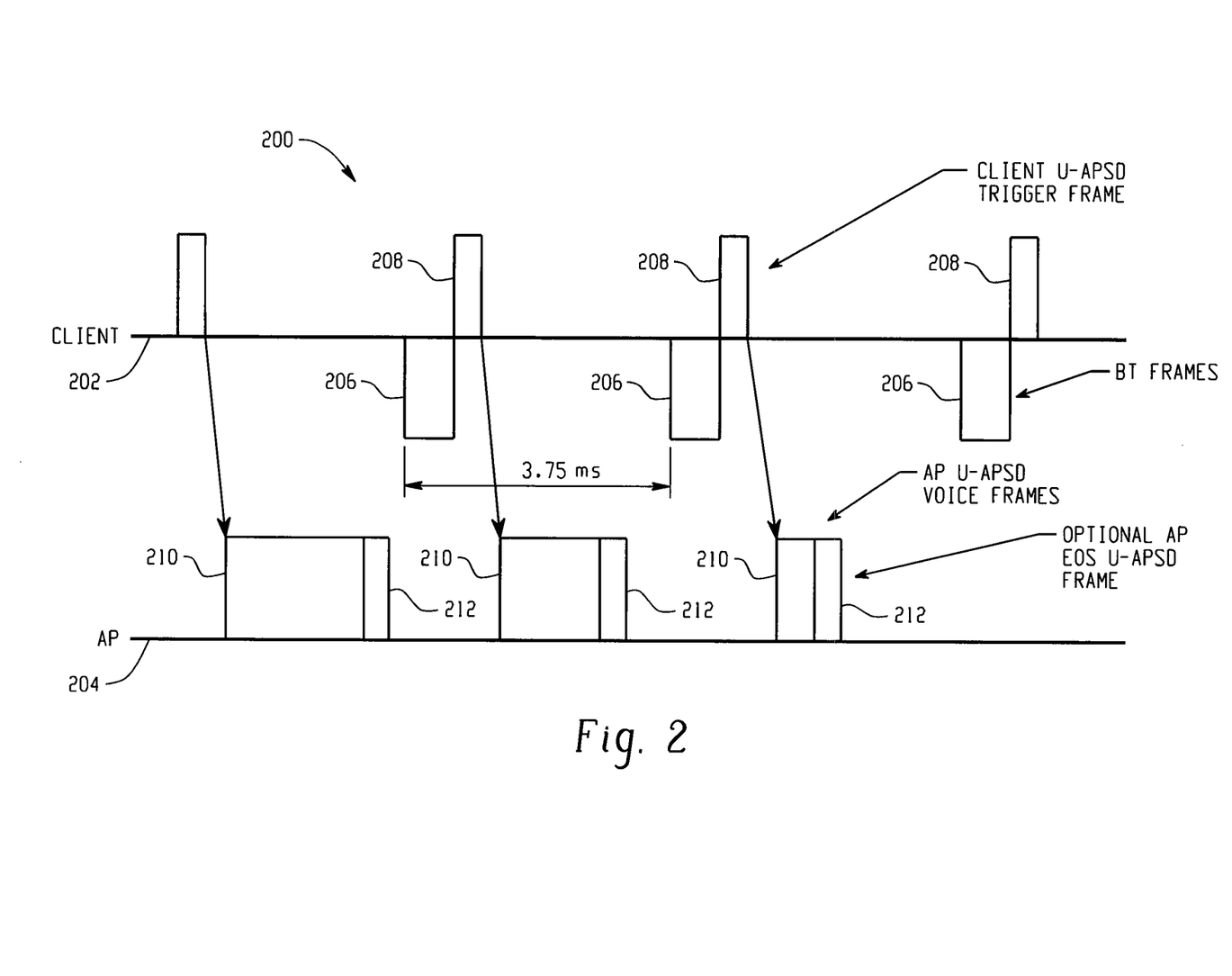
FIG. 2 is a signal diagram illustrating an example of a client with a first wireless transceiver that employs a first protocol, for example a personal area network (PAN) protocol such as BLUETOOTH and the second wireless transceiver that employs a second protocol such as a wireless local area networking (WLAN) protocol communicating with an AP supporting the second protocol.
Figure 4:
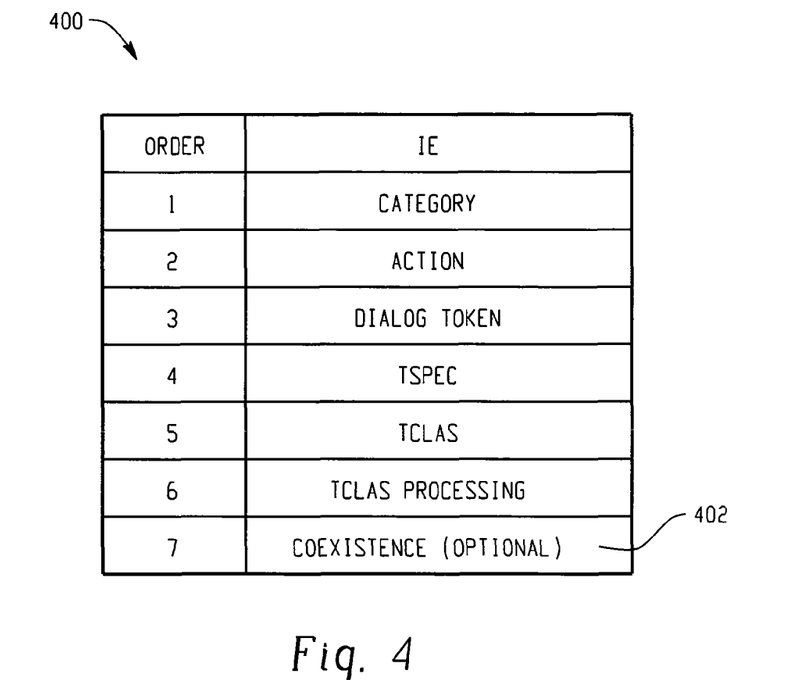
FIG. 4 illustrates an example of an Add Traffic Specification frame indicating coexistence capability.

For example, referring to FIG. 2 with continued reference to FIG. 1, there is illustrated an example signal diagram 200 where first wireless transceiver 102 sends frames at periodic intervals, for example during a 3.75 ms interval, wherein a BLUETOOTH transceiver may send signals of 1.25 ms duration. Frames sent by apparatus (client) 100 are illustrated along line 202, and frames sent by the access point (AP) are illustrated along line 204. In the illustrated example, control logic 108 determines that first wireless transceiver 102 sends frames 206 at periodic intervals, where the service period is 3.75 ms and the frames sent by first wireless transceiver 202 are 1.25 ms in duration. If the trigger signals 208 can take up to 0.5 ms for transmission to complete, the duration of the time period when first wireless transceiver 204 can receive signals is 2 ms. Therefore, control logic 108 sends a frame, such as a add traffic specification (ADDTS) frame (see, e.g., frame 400 in FIG. 4 described herein infra) indicating to the AP that wireless transceiver 104 can receive frames for a duration of up to 2 ms after a trigger frame is sent.

In the illustrated example where the interference from wireless transceiver 102 is periodic, control logic 108 sends a trigger signal 208 after frame 206 is sent by first wireless transceiver 102; however, those skilled in the art should readily appreciate that control logic 108 may send the signal after every frame, only when second wireless transceiver 104 has something to transmit, and/or when the second wireless transceiver 104 expects to receive something. In response to receiving a trigger frame 206, the AP sends data 210 (for example an unscheduled automatic power save delivery "U-APSD" voice frame) for wireless transceiver 204. Note that the amount of data 204 may vary from one interval to the next. Optionally, when the AP or client doesn't have any more data to send to wireless transceiver 204, the AP or client may also send a data or null-data frame 212 with the End of Service Period (EOSP) bit set.

Figure 3:
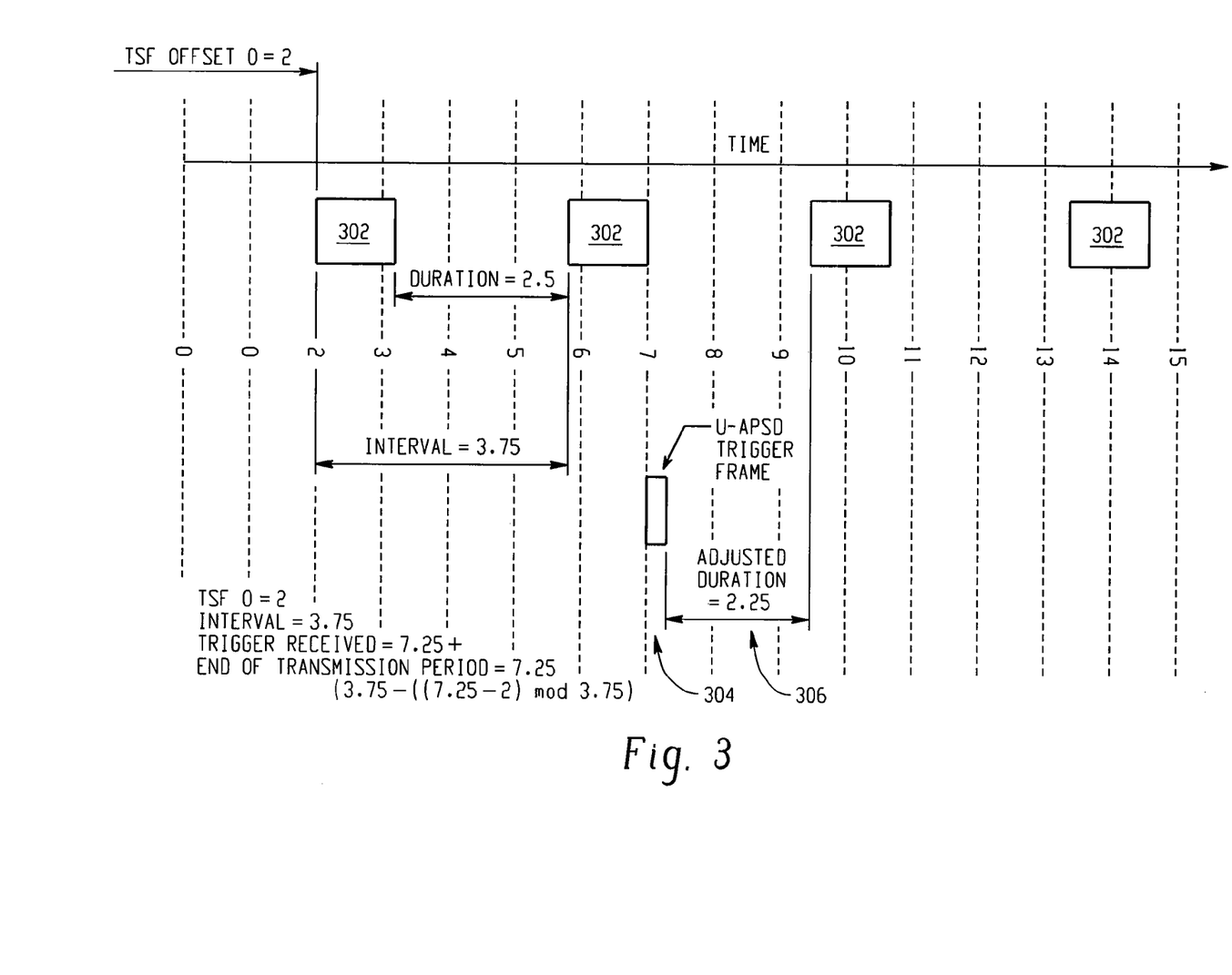
FIG. 3 is a signal diagram illustrating an example where a first wireless transceiver employs a personal area network (PAN) protocol such as BLUETOOTH and the second wireless transceiver employs a wireless local area networking (WLAN) protocol with the time period where the second wireless transceiver can receive frames is offset.

Referring now to FIG. 3 with continued reference to FIG. 1, there is illustrated an example signal diagram 300 where control logic 108 indicates an offset. Together with the interference period, this indicates when first wireless transceiver 102 is not transmitting and/or receiving) so the second wireless transceiver 204 can send and/or receive uplink/downlink frames: i.e. it indicates when the interference free period ends. The offset may be further modified to allow for clock drift In this example, the offset is a timing synchronization function (TSF) value and during each service period periodic interference 302, such as when wireless transceiver 102 is transmitting, interferes with the ability of wireless transceiver 204 to transmit and/or receive data. The offset is represented by 304 and the adjusted duration is represented by 306. In this example, the end of transmission period is calculated as: End of transmission period=T+(Interval−((T−TSF 0 Offset) mod Interval)), where T is the time the U-APSD trigger frame was received at the AP. The AP transmits buffered frames after receiving a trigger frame until the end of the adjusted duration period calculated based on the interval of interference and offset.

Figure 5:
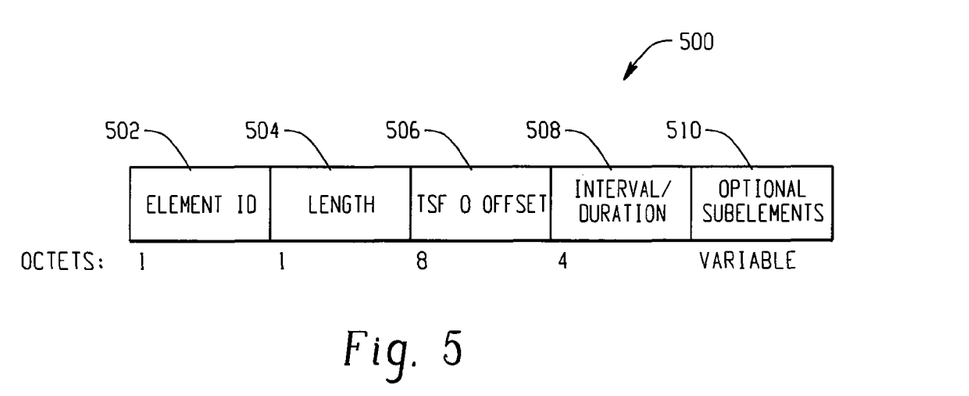
FIG. 5 is a block diagram illustrating an example of an information element (IE) suitable for implementing an example embodiment.

In an example embodiment, wireless transceiver 104 may receive a signal from an access point indicating that it supports an interference coexistence protocol. For example, a new bit may be added to an Extended Capabilities IE (Information Element) to indicate coexistence services as described herein are supported. Control logic 108 may then send a frame similar to frame 400 illustrated in FIG. 4, which illustrates an example of an Institute of Electrical and Electronics Engineers (IEEE) 802.11 add traffic specification (ADDTS) frame to request coexistence services. The frame includes an additional field 402 requesting interference coexistence service. In embodiments where U-APSD trigger frames are used, the additional field may be referred to as U-ASPD coexistence. An example of an information element (IE) 500 is provided in FIG. 5. In this example, the Element ID field 502 is equal to a predefined value to indicate the IE is a coexistence IE. The value of the Length field 504 is 12 plus the length of any additional subelements present. A non-zero value of the TSF 0 Offset field 506 is the TSF value when the start of an interference burst was detected. The AP uses the TSF 0 Offset field 506 together with the Interval/Duration field 508 to enqueue frames for transmission to second wireless transceiver 104. A TSF 0 Offset field 506 value of 0 requests that the AP transmit frames without using the TSF 0 Offset procedures. The Interval/Duration field 508 is defined as:

1) If the TSF 0 Offset field 506 is 0, the Interval/Duration field 508 is the number of microseconds during service period when the AP transmits frames; or 2) When the TSF 0 Offset field 506 is non-zero, the Interval/Duration field 508 is the number of microseconds between the start of consecutive interference bursts. The Optional Subelement field 510 format contains zero or more subelements, each having a one octet Subelement ID field, a one octet Length field and a variable length Data field. The optional subelements are ordered by non-decreasing Subelement ID.

For example, table 1 below illustrates an example ADDTS frame that would be sent by control logic 108 indicating interference was detected and the preferred duration that an AP should transmit frames during a service period.

TABLE 1

| Order | IE | Value |
| --- | --- | --- |
| 1 | Category | QoS (1) |
| 2 | Action | ADDTS request (0) |
| 3 | Dialog Token | N |
| 4 | TSPEC | QoS Flow #1 Parameters |
| 5 | TCLAS | QoS Flow #1 Traffic |
| 6 | TCLAS Processing | QoS Flow #1 Processing |
| 7 | Coexistence | TSF 0 Offset = 0 us Duration = 2 ms |

If control logic 108 detects changes in the interference, control logic 108 may send another ADDTS frame to update the duration field as necessary. An example is illustrated in Table 2 below.

TABLE 2

| Order | IE | Value |
| --- | --- | --- |
| 1 | Category | QoS (1) |
| 2 | Action | ADDTS request (0) |
| 3 | Dialog Token | N |
| 4 | TSPEC | QoS Flow #1 Parameters |
| 5 | TCLAS | QoS Flow #1 Traffic |
| 6 | TCLAS Processing | QoS Flow #1 Processing |
| 7 | Coexistence | TSF 0 Offset = 0 us Duration = 4 ms |

If control logic 108 determines that interference has stopped and coexistence services are no longer desired, an ADDTS frame similar to Table 3 below may be transmitted. In this frame, although coexistence services are no longer requested (Note that the coexistence, #7 does not appear in this frame indicating the service is no longer desired), Quality of Service (QoS) services are still being requested.

TABLE 3

| Order | IE | Value |
| --- | --- | --- |
| 1 | Category | QoS (1) |
| 2 | Action | ADDTS request (0) |
| 3 | Dialog Token | N |
| 4 | TSPEC | QoS Flow #1 Parameters |
| 5 | TCLAS | QoS Flow #1 Traffic |
| 6 | TCLAS Processing | QoS Flow #1 Processing |

Figure 6:
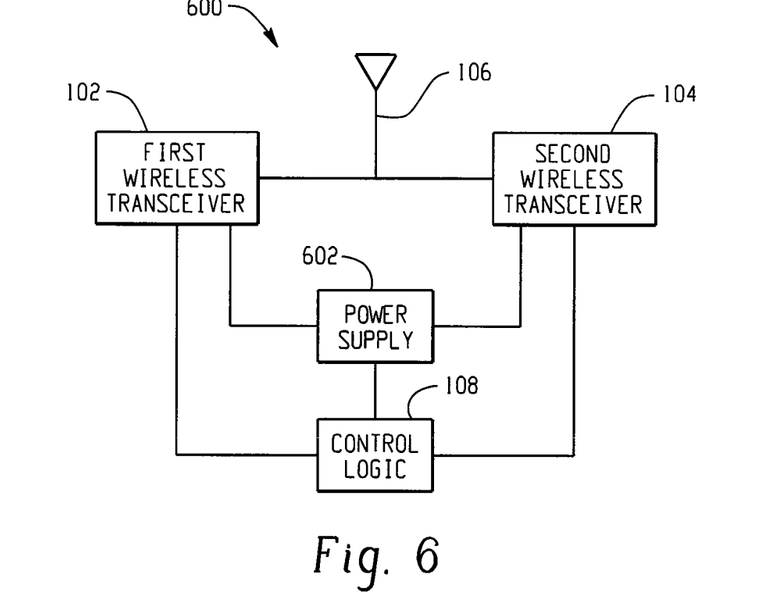
FIG. 6 is a block diagram illustrating an example of an apparatus with multiple transceivers that share a common power supply and a common antenna.
Figure 7:
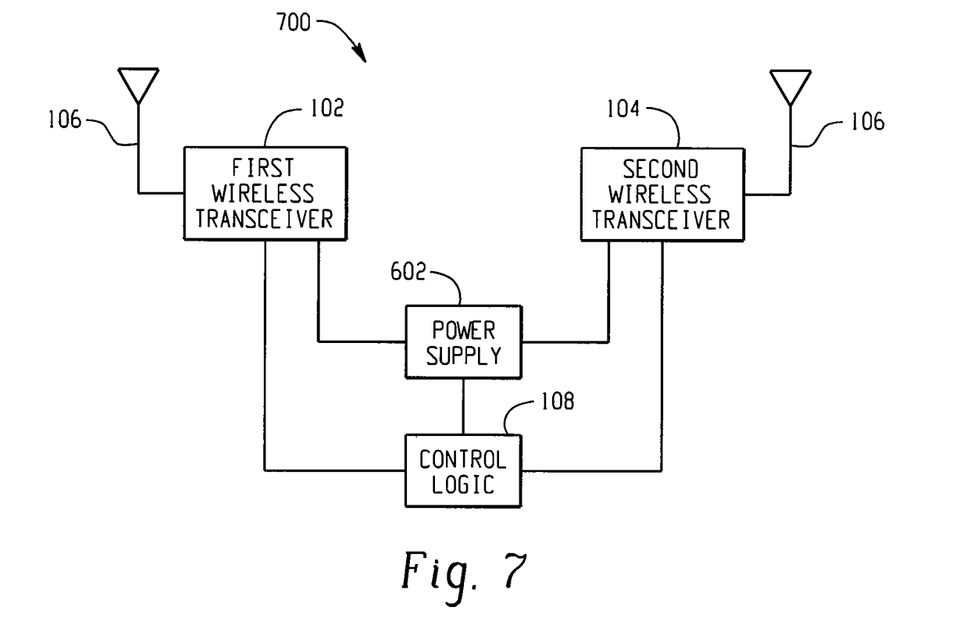
FIG. 7 is a block diagram illustrating an example of an apparatus with multiple transceivers that share a common power supply where each transceiver has its own antenna.

As those skilled in the art can readily appreciate, the principles described herein can be adapted to any wireless device that shares resources. For example, FIG. 6 illustrates an example of an apparatus 600 with multiple transceivers 102, 104 that share a common power supply 602 and a common antenna 106. Control logic 108 may also control the operation of power supply 602. In an example embodiment, control logic 108 may also place second wireless transceiver 104 in a power save state while first wireless transceiver 102 is transmitting, and optionally, place first wireless transceiver 102 in a power save state during a time period that second wireless transceiver 104 is transmitting. In FIG. 7, there is illustrated an apparatus 700 where wireless transceivers 102, 104 share a common power supply 602; however, wireless transceivers 102, 104 have their own separate antennas 106.

Figure 8:
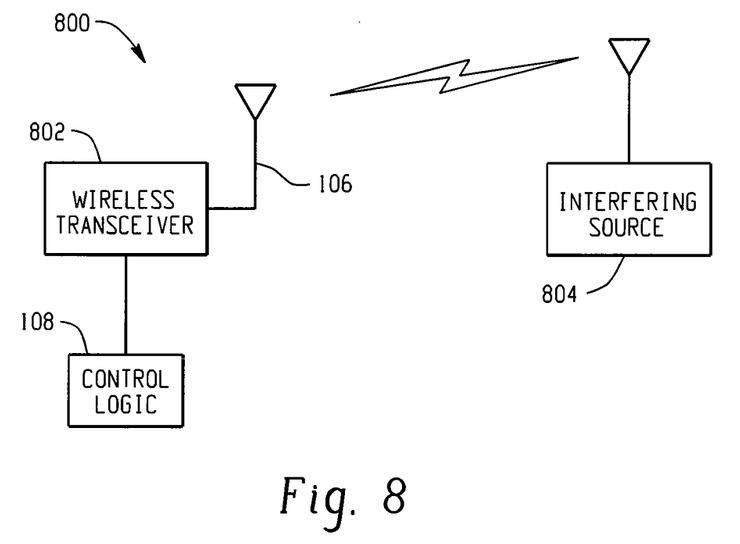
FIG. 8 is a block diagram illustrating an example of an apparatus receiving signals from an external source of interference.

Those skilled in the art should also readily appreciate that the principles described herein can be suitably adapted to provide coexistence with any type of interference. For example, FIG. 8 illustrates an example of an apparatus 800 where wireless transceiver 802 receives signals from an external source of interference 804 that interfere with wireless transceivers 802 ability to receive frames. Control logic 108 based on signals received via wireless transceiver 802 from interfering source 804 can determine a time period when interfering source 804 does not interfere with wireless transceiver 802's ability to receive. The signals from interfering source may be periodic or aperiodic. In either case, control logic 108 may send a signal to an AP, for example an ADDTS signal as described herein supra, to inform the AP the duration of the time period for sending data, and send a trigger signal when interference from interfering source 804 stops to request buffered frames from the AP.

Figure 9:
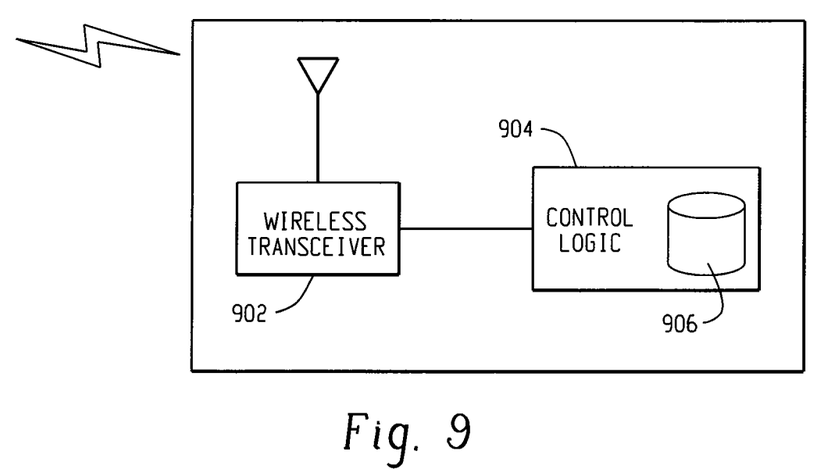
FIG. 9 is a block diagram illustrating an example of an access point 900 suitable for implementing an example embodiment.

FIG. 9 is a block diagram illustrating an example of an access point 900 suitable for implementing an example embodiment. Access point (AP) 900 comprises a wireless transceiver 902 and control logic 904. Control logic 904 is suitably configured to send and receive data via wireless transceiver 902.

In an example embodiment, control logic 904 broadcasts a signal indicating that it supports coexistence services (which may also be referred to as U-APSD coexistence) via wireless transceiver 902. When a mobile device associates, control logic 904 determines whether the mobile device requested coexistence services (for example if the mobile device sent an ADDTS frame as described herein supra), and if so whether the duration of the time period for sending data to the mobile device, and if applicable an offset which may be based on a TSF. In particular embodiments, control logic 904 may further comprise a table 906 for storing coexistence data for the mobile devices.

Control logic 904 buffers data for the wireless device until a trigger signal is received. In response to a trigger frame, control logic 904 sends buffered data to the wireless device via wireless transceiver 902 until either all of the data is sent (indicated via EOSP) or the expiration of the time period, in which case any unsent data is buffered until a future trigger signal is received. The data may be sent immediately after receipt of the trigger frame or after a predetermined delay which may be specified in the request and/or trigger frame.

Figure 10:
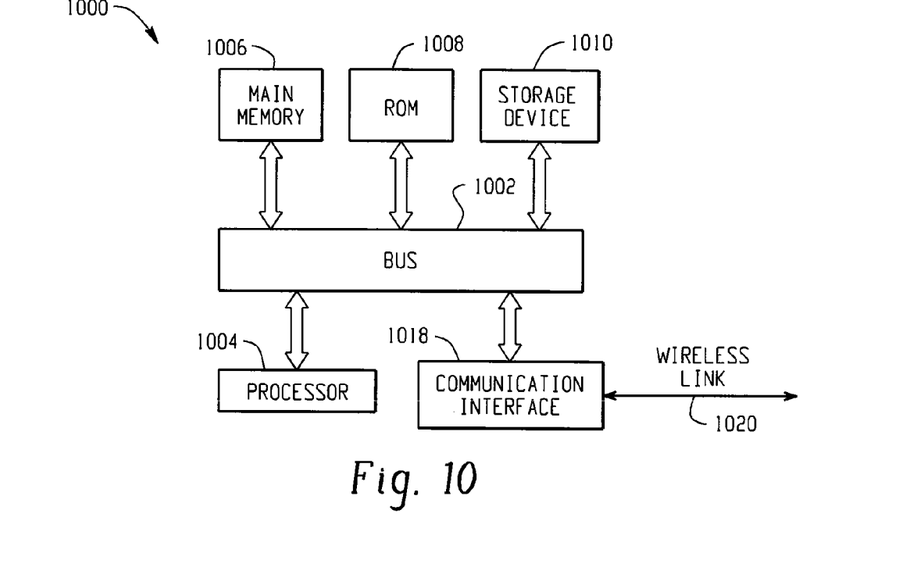
FIG. 10 is a block diagram that illustrates a computer system upon which an example embodiment may be implemented.

FIG. 10 is a block diagram that illustrates a computer system 1000 upon which an example embodiment may be implemented. Computer system is suitable for implementing the functionality described herein for control logic 108 (FIGS. 1 and 6-8), and/or control logic 904 (FIG. 9).

Computer system 1000 includes a bus 1002 or other communication mechanism for communicating information and a processor 1004 coupled with bus 1002 for processing information. Computer system 1000 also includes a main memory 1006, such as random access memory (RAM) or other dynamic storage device coupled to bus 1002 for storing information and instructions to be executed by processor 1004. Main memory 1006 also may be used for storing a temporary variable or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

An aspect of the example embodiment is related to the use of computer system 1000 for enabling wireless transceivers to request coexistence services as described herein and/or to provide support for coexistence services described herein. According to an example embodiment, enabling wireless transceivers to request coexistence services as described herein and/or to provide support for coexistence services described herein is provided by computer system 1000 in response to processor 1004 executing one or more sequences of one or more instructions contained in main memory 1006. Such instructions may be read into main memory 1006 from another computer-readable medium, such as storage device 1010. Execution of the sequence of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1004 for execution. Such a medium may take many forms, including but not limited to non-volatile media, and volatile media. Non-volatile media include for example optical or magnetic disks, such as storage device 1010. Volatile media include dynamic memory such as main memory 1006. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 1000 also includes a communication interface 1018 coupled to bus 1002. Communication interface 1018 provides a two-way data communication coupling computer system 1000 to external devices (not shown) via wireless link 1020 For example, communication interface 1018 may be employed to implement the functionality of wireless transceiver 102 (FIGS. 1 and 6-7), wireless transceiver 104 (FIGS. 1 and 6-7), wireless transceiver 802 (FIG. 8) and/or wireless transceiver 902 (FIG. 9).

In an example embodiment, computer system 1000 can send messages and receive data, including program codes, through network(s) via wireless link 1020, and communication interface 1018. In accordance with an example embodiment, one such downloaded application provides for interference coexistence as described herein.

Figure 11:
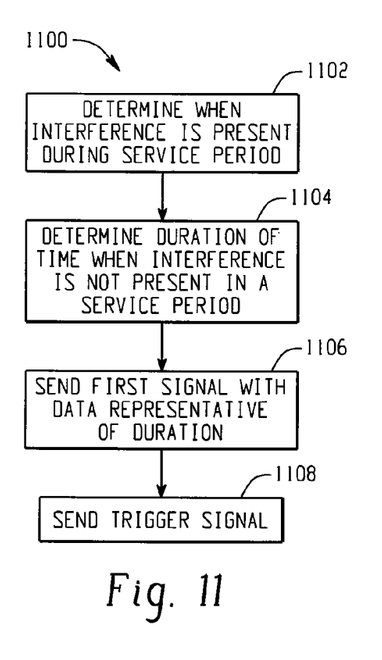
FIG. 11 is a block diagram of a methodology for enabling a wireless device to achieve coexistence with interfering sources.
Figure 12:
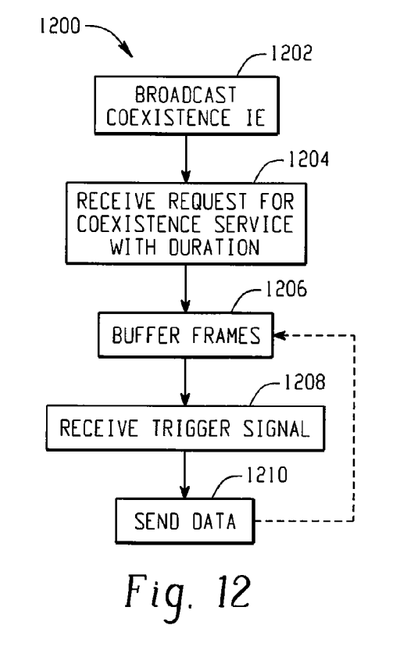
FIG. 12 is a block diagram of a methodology for an access point to provide coexistence service to a wireless device.

In view of the foregoing structural and functional features described above, methodologies in accordance with example embodiments will be better appreciated with reference to FIGS. 11-12. While, for purposes of simplicity of explanation, the methodologies of FIGS. 11-12 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies. The methodologies described herein are suitably adapted to be implemented in hardware, software, or a combination thereof.

FIG. 11 is a block diagram of a methodology 1100 for achieving coexistence with interfering sources. Methodology 100 may be implemented by control logic 108 (FIGS. 1 and 6-8) and/or processor 1004 (FIG. 10). Methodology 1100 may be employed for embodiments where the source of interference is known, for example if two radios are sharing an antenna and one or both radios cannot receive data while the other radio is transmitting, or if the source of interference is unknown such as an external source. When a wireless device associates with another device, such as an AP, the wireless device may determine from signals received from the device whether the device supports a coexistence protocol.

At 1102, a determination is made when interference is present during a service period. The interference may be periodic.

At 1104, a determination is made of a duration of time that interference is not present during a service period. If the interference is periodic, the duration of time should be the same for all service periods. In an example embodiment, the duration of the interference may be set to a portion of a service period. In this case the portion is selected that insures no overlap with the interfering source.

At 1106, a signal is sent comprising data representative of the duration of the non-interfering time period. In particular embodiments, the signal further comprises data representative of an offset, or delay, for by when to finish sending the signal. The offset may be based on any criteria such a TSF value or an amount of time after the trigger signal is received. The offset may be chosen to allow data to be transmitted without interference so some time even in the presence of clock drift. In an example embodiment, the data representative of the duration of the non-interfering time period, and optionally any offset, are sent in an information element. In particular embodiments, the signal comprises an ADDTS frame.

At 1108, a trigger signal is sent to receive buffered data. The trigger signal is sent after interference has stopped. Data may be received until the duration period expires or until all of the buffered data is received. In the case of periodic interference, the trigger signal is sent every service period after the interference has stopped, or is sent only if there is data to transmit and/or expected to be received. In an example embodiment, the trigger signal is a U-APSD trigger frame such as a QoS null frame or Data frame.

Methodology 1100 may be repeated if changes in interference are detected. For example, 1102, 1104, 1106, 1108 may be repeated if the amount of time interference is present changes. If interference stops, a signal may be sent canceling the coexistence service.

FIG. 12 is a block diagram of a methodology 1200 for an access point to provide coexistence service to a wireless device. Methodology 1200 is suitable to be implemented by control logic 904 (FIG. 9) and/or processor 1004 (FIG. 10).

At 1202, the AP broadcast a signal advertising it supports a coexistence protocol. In an example embodiment, the advertisement is sent in an information element (IE). The IE may be sent with beacon frames, probe response frames and/or during association.

At 1204, a request is received for coexistence service. The request may include data representative of a maximum time period (duration) for sending frames upon receipt of a trigger frame. In particular embodiments, the request may further comprise an offset as a TSF value, and the duration may be computed as a function of the offset and TSF timer as T+(Interval−((T−TSF 0 Offset) mod Interval)), where T is the TSF time the trigger frame was received.

At 1206, responsive to receiving the request for U-APSD service optionally including coexistence service at 1204, the AP buffers data for the mobile device. Data is buffered until a trigger signal is received.

At 1208, a trigger signal is received. In an example embodiment, the trigger signal is a U-APSD trigger frame such as a QoS null frame or Data frame.

At 1210, the AP sends the buffered data to the mobile device in response to receiving the trigger frame. If the data can be sent in a time period less that is less than the duration specified in the request frame, all of the data is sent. In an example embodiment, when the AP doesn't have any more data to send to the mobile device, the AP may send a data or null-data frame with an End of Service Period (EOSP) bit set.

If there is more data buffered than can be sent in the duration period specified in the request, data is sent until the duration period expires. Any remaining buffered data is saved and the AP waits until receiving another trigger frame before sending more data.

As one skilled in the art can readily appreciate 1206, 1208, 1210 are repeated until the communications with the mobile device are concluded or until the mobile device sends a signal requesting the cancellation of coexistence service. After the duration period has expired, the AP will again buffer frames until a trigger frame is sent.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an antenna;
a first wireless transceiver coupled with the antenna;
a second wireless transceiver coupled with the antenna;
control logic coupled with the first wireless transceiver and the second wireless transceiver, the control logic controlling the operation of the first wireless transceiver and the second wireless transceiver;
wherein the control logic operates the first wireless transceiver for a first time period during a service period;
wherein the control logic determines a second time period during the service period that does not conflict with the first time period where the second wireless transceiver can receive signals;
wherein the control logic sends a signal with data representative of the second time period via the second wireless transceiver, wherein the data representative of the second time period comprises a duration period and an offset value for requesting delivery of buffered signals during the duration period and after a predetermined delay of the offset value after a trigger signal; and
wherein the control logic sends the trigger signal at an expiration of the first time period.

2. The apparatus of claim 1, wherein the trigger signal is sent after the expiration of the first time period when the second wireless transceiver expects to receive a packet.

3. The apparatus of claim 1, wherein the trigger signal is sent every time the first time period expires.

4. The apparatus of claim 1, wherein the trigger signal is sent after the expiration of the first time period when the second wireless transceiver has a packet to transmit.

5. The apparatus of claim 1, wherein the service period is periodic; and
wherein the control logic sends a trigger signal each service period after the first time period.

6. The apparatus of claim 1, wherein the trigger signal sent via the second wireless transceiver comprises an unscheduled automatic power save delivery trigger frame.

7. The apparatus of claim 1, wherein the trigger signal sent via the second wireless transceiver requests immediate delivery of buffered frames.

8. The apparatus of claim 1, wherein the predetermined delay is a time period expressed as a timing synchronization function value.

9. The apparatus of claim 1, wherein the control logic receives a signal received via the second wireless transceiver indicating an access point supports a protocol enabling the control logic to indicate the service period for receiving signals.

10. The apparatus of claim 9, wherein the control logic sends the signal with data representative of the second time period via the second wireless transceiver responsive to receiving the signal indicating the access point supports the protocol enabling the control logic to indicate the time period during the service period for receiving signals.

11. The apparatus of claim 10, wherein the signal sent by the control logic to employ the protocol for receiving signals comprises an information element with data representative of a duration of the time period for receiving signals.

12. The apparatus of claim 1, wherein the control logic determines a change in the first time period;
wherein the control logic determines a change in the second time period responsive to the change in the first time period; and wherein the control logic sends a signal via the second wireless transceiver, the signal comprising data representative of the change in the second time period.

13. The apparatus of claim 1, wherein the control logic determines that the first wireless transceiver has discontinued operation; and wherein the control logic sends a signal via the second wireless transceiver, the signal comprising data indicating the second wireless transceiver is operative to receive signals at any time and coexistence services are no longer desired responsive to determining the first wireless transceiver has discontinued operation.

14. A method, comprising:

determining during a service period, a first time period where interference is present;

determining duration of time during the service period where interference is not present;

sending a first signal, the first signal comprising data representative of the duration of time during the service period where interference is not present, and data representative of a predetermined delay to wait before sending data after a trigger signal; and sending the trigger signal at a time when the first time period expires indicating a start of the duration of time during the service period where the interference is not present.

15. The method according to claim 14, wherein the service period is periodic; and wherein the trigger signal is sent every service period after the first time period has expired.

16. The method of claim 14, wherein the first signal comprises a predefined information element with the data representative of the duration of time during the service period where interference is not present.

17. The method of claim 16, wherein the trigger signal comprises an unscheduled automatic power save delivery frame.

18. The method of claim 14, further comprising:

determining a change in the first time period;

determining a change of the duration of the time during the service period where interference is not present responsive to determining the change in the first time period; and sending a signal with data representative of the changed duration of time during the service period where interference is not present.

19. The method of claim 14, further comprising:

determining the interference has ceased; and sending a signal indicating the interference has ceased and coexistence services are no longer desired.

20. The method of claim 14, further comprising determining an access point supports a predetermined protocol for specifying a predefined duration of time for receiving data;

wherein sending the first signal is responsive to determining the access point supports the predetermined protocol for specifying the predefined duration of time for receiving data.

21. An apparatus, comprising:

a memory;

a wireless transceiver; and control logic coupled with the wireless transceiver and the memory, the control logic sending and receiving data via the wireless transceiver;

wherein the control logic broadcasts via the wireless transceiver data indicating that the control logic supports a coexistence service;

wherein the control logic determines from a signal received from an associated mobile device via the wireless transceiver whether the associated mobile device is requesting the coexistence service, a maximum time period that the associated mobile device can receive frames, and a delay period to wait before sending frames after a trigger signal;

wherein the control logic buffers first frames for the associated mobile device responsive to receiving a signal from the associated mobile device requesting the coexistence service;

wherein the control logic sends the buffered first frames to the associated mobile device responsive to receiving a first trigger signal via the wireless transceiver after waiting the delay period after receiving the trigger signal; and wherein the control logic sends via the wireless transceiver the buffered first frames until one of a group consisting of i) more first frames are buffered and ii) the maximum time period expires wherein selected buffered first frames are saved in the memory of the apparatus and second frames are buffered for the associated mobile device.

* * * * *

UNITED STATES PATENT AND TRADEMARK OFFICE
CERTIFICATE OF CORRECTION

PATENT NO.        : 9,106,348 B2
APPLICATION NO.   : 12/909307
DATED             : August 11, 2015
INVENTOR(S)       : Thomson et al.

It is certified that error appears in the above-identified patent and that said Letters Patent is hereby corrected as shown below:

In the Claims:

Column 12, Claim 21, Line 40, please insert --no-- before more.

Signed and Sealed this
Twenty-second Day of March, 2016

Michelle K. Lee
*Director of the United States Patent and Trademark Office*